United States Patent
Aoyama (10) Patent No.: US 8,438,317 B2
(45) Date of Patent: *May 7, 2013

(54) ELECTRONIC DEVICE AND CONTROL METHOD THEREFOR

(75) Inventor: Satoshi Aoyama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/426,984

(22) Filed: Mar. 22, 2012

(65) Prior Publication Data

US 2012/0182446 A1    Jul. 19, 2012

Related U.S. Application Data (63) Continuation of application No. 11/284,004, filed on Nov. 21, 2005, now Pat. No. 8,166,210.

(30) Foreign Application Priority Data

Nov. 19, 2004    (JP) .................................. 2004-336222

(51) Int. Cl.
    *G06F 3/00*    (2006.01)
(52) U.S. Cl.
    USPC ............................................. 710/10; 710/14
(58) Field of Classification Search ....................... 710/10
    See application file for complete search history.

(56) References Cited

U.S. PATENT DOCUMENTS

| | | | |
|---|---|---|---|
| 5,428,730 A | 6/1995 | Baker et al. | |
| 5,701,481 A | 12/1997 | Hosaka et al. | |
| 5,761,373 A | 6/1998 | Yamamoto | |
| 6,112,302 A | 8/2000 | Fujii et al. | |
| 6,172,955 B1 | 1/2001 | Hashimoto | |
| 2003/0142217 A1* | 7/2003 | Maehama et al. | 348/207.99 |
| 2004/0057366 A1* | 3/2004 | Sasaki | 369/53.37 |
| 2006/0044397 A1* | 3/2006 | Satoh et al. | 348/207.99 |
| 2006/0112195 A1 | 5/2006 | Aoyama | |

FOREIGN PATENT DOCUMENTS

| | | |
|---|---|---|
| JP | 59060645 A | 4/1984 |
| JP | 6-225252 A | 8/1994 |
| JP | 11-134799 A | 5/1999 |
| JP | 2003-224809 A | 8/2003 |
| JP | 2004-164809 A | 6/2004 |

* cited by examiner

*Primary Examiner* — Henry Tsai
*Assistant Examiner* — John Roche
(74) *Attorney, Agent, or Firm* — Rossi, Kimms & McDowell LLP (57) ABSTRACT

According to this invention, when initialization of a storage medium such as a flash memory is erase of the data area, the processing can be stopped. When the processing is stopped, at least initialization of the management area has been completed, and processing using the storage medium can be executed. If erase processing is not stopped but proceeds to the end, no erase processing need be performed in writing new data, and high-speed write is promised. For this purpose, when complete formatting is designated, the management area of the file system is first initialized. Then, erase processing for the data area of the file system is executed by a predetermined block size. If it is determined that stop is designated during the data area erase processing, the processing ends, but the management area has already been initialized.

10 Claims, 7 Drawing Sheets

| INITIALIZATION OF MEMORY CARD |
|---|
| FORMATTING IS IN PROGRESS. |

ELECTRONIC DEVICE AND CONTROL METHOD THEREFOR

This is a continuation of U.S. patent application Ser. No. 11/284,004, filed 21 Nov. 2005, the entire content of which is herein incorporated by reference.

FIELD OF THE INVENTION

The present invention relates to an electronic device such as a digital camera, and a control method therefor.

BACKGROUND OF THE INVENTION

An image sensing apparatus such as a digital camera generally stores (writes) a sensed image in a detachable memory card (e.g., a compact Flash®) which incorporates a flash memory. The flash memory is nonvolatile and can repetitively erase/write data as its characteristic features.

Erase/write of data from/in a flash memory is executed by a predetermined size called a block which forms the flash memory. For example, when data are rewritten in a block in which data have already been written, previous data are erased by the block size, all data are electrically cleared, and then new data are written. In an erased block, new data are simply written by the block size.

Because of these features of the flash memory, write can be achieved at a higher speed in an erased block from which no data need be erased, than in a block in which data has already been written.

Since the memory card is used in various information devices such as a personal computer by using a predetermined adaptor (card reader/writer), a file system such as FAT (File Allocation Table) is generally constructed. The flash memory can logically discriminate a management area for the file system and a data area where data actually exists. When image data is saved in a digital camera or the like, management information in the management area is searched for the free space of the data area. It is recorded that the free space is in use, and actual image data is recorded in the data area. To the contrary, when image data is deleted or the area is formatted, image data itself in the data area is not erased but is left, and the use status of a corresponding part of image data in the management area, or for formatting, the use status of the entire part is freed.

For this processing, there is known a technique of detecting a data area which is represented as a free space in the management area, and erasing data from the detected area (e.g., Japanese Patent Laid-Open No. 2003-224809).

Recent digital cameras tend to have many image sensing pixels, and increase the data amount per unit time in the moving image photographing mode or sequential shooting mode. Previous image data may be written even in a free area, and a long time is taken to record image data in a situation in which high-speed write is required for the sequential shooting mode, high-resolution moving image photographing mode, or the like.

Even if data in the management area is erased, previous data remains in the data area, and the image data may be reconstructed against user's will.

To prevent this problem, it is apparently desirable to erase data not only from the management area of the memory card but also from the data area. However, as the capacities of recent memory cards become larger, the time taken for erase becomes considerably longer. Demands for urgently performing another process (e.g., image sensing) cannot be met.

SUMMARY OF THE INVENTION

The present invention has been made to overcome the conventional drawbacks, and has as its object to provide a technique which implements both erase of the data area and shift to another emergent processing.

To solve the above-described problems, an electronic device according to the present invention has, e.g., the following configuration.

That is, there is provided an electronic device capable of attaching a detachable storage medium which incorporates a semiconductor memory element, comprising designation means for designating initialization of the storage medium, management area initialization means for initializing a management area of a file system of the storage medium when the designation means designates initialization, data area erase means for performing erase processing from a data area of the storage medium by a predetermined block size after the management area initialization means initializes the management area, determination means for determining whether stop of the erase processing has been designated when the data area erase means erases data of the block size, and control means for stopping the data area erase processing when the determination means determines that stop has been designated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings.

Figure 1:
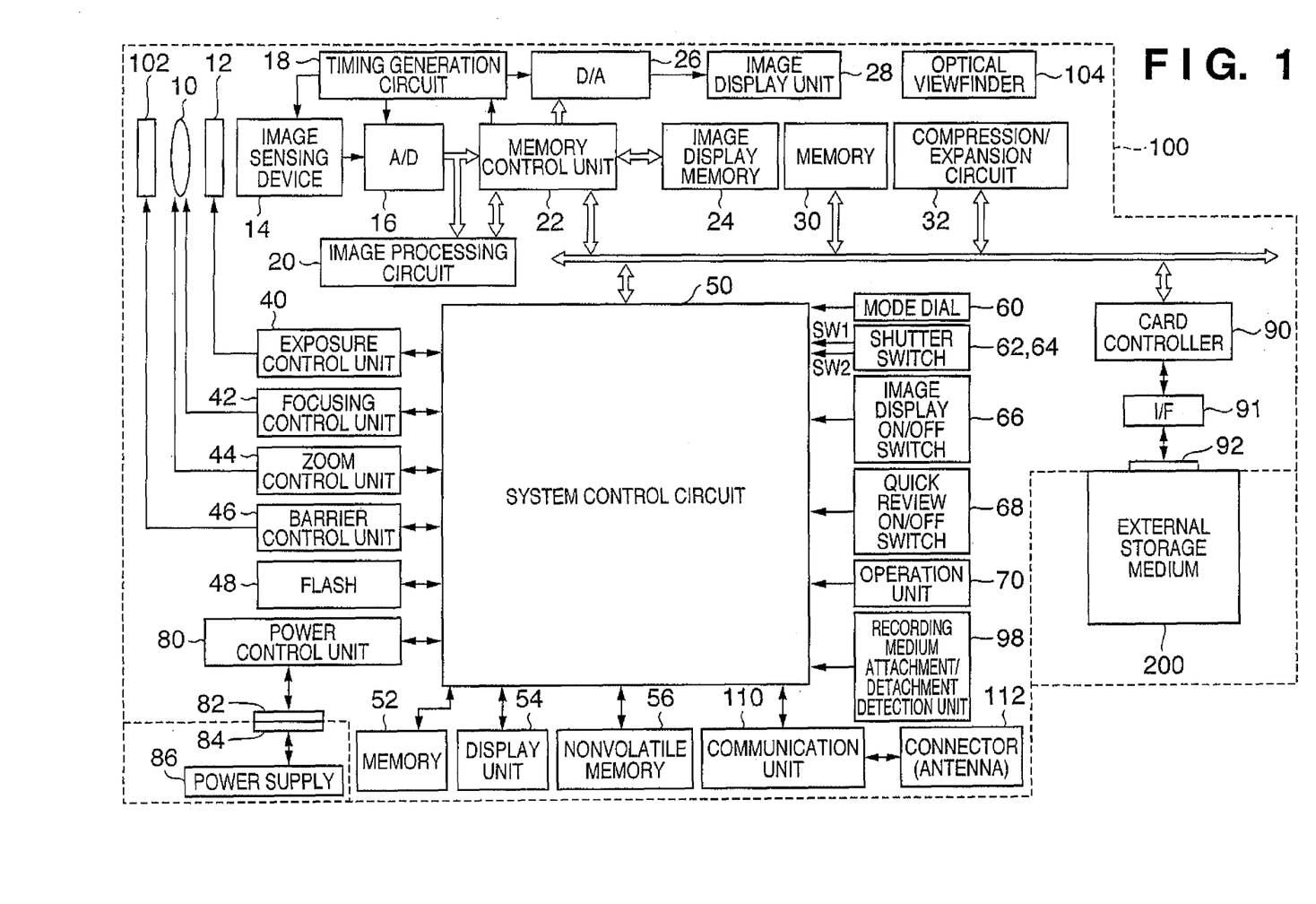
FIG. 1 is a block diagram showing a digital camera according to an embodiment.

FIG. 1 is a block diagram showing a digital camera (image sensing apparatus) 100 to which the embodiment is applied.

In FIG. 1, reference numeral 10 denotes a photographing lens; 12, a shutter having an aperture function; 14, an image sensing device which converts an optical image into an electrical signal; and 16, an A/D converter which converts an analog signal output from the image sensing device 14 into a digital signal.

Reference numeral 18 denotes a timing generation circuit which supplies a clock signal and control signal to the image sensing device 14, the A/D converter 16, and a D/A converter 26, and is controlled by a memory control circuit 22 and system control circuit 50.

Reference numeral 20 denotes an image processing circuit which performs predetermined pixel interpolation processing and color conversion processing on data from the A/D converter 16 or data from the memory control circuit 22.

The system control circuit 50 controls the whole system, and controls an exposure control unit 40 and focusing control unit 42 on the basis of the result of predetermined calculation processing on image data sensed by the image processing circuit 20. As a result, TTL (Through The Lens) AF (Auto Focus) processing, AE (Auto Exposure) processing, and EF (pre-flash) processing can be performed. Further, the image processing circuit 20 performs predetermined calculation processing using sensed image data, and also performs TTL AWB (Auto White Balance) processing on the basis of the obtained calculation result.

The memory control circuit 22 controls access between the A/D converter 16, the timing generation circuit 18, the image processing circuit 20, the D/A converter 26, a compression/decompression circuit 32, an image display memory 24, and a memory 30.

For example, sensed image data output from the A/D converter 16 is written into the image display memory 24 or memory 30 via the image processing circuit 20 and memory control circuit 22, or directly via the memory control circuit 22.

Reference numeral 24 denotes the image display memory; 26, the D/A converter; and 28, an image display unit which is formed from a TFT-LCD or the like. Display image data written in the image display memory 24 is displayed on the image display unit 28 via the D/A converter 26. The image display unit 28 is arranged on the back surface of the camera body, and used to display various menus for playing back sensed images. An electronic viewfinder function can be implemented by sequentially displaying sensed image data on the image display unit 28.

The image display unit 28 arbitrarily turns on/off its display in accordance with an instruction from the system control circuit 50. If the display is turned off, the backlight is turned off, display driving is stopped, and thereby power consumption of the digital camera 100 can be greatly reduced.

The memory 30 temporarily stores photographed still and moving images, and has a storage capacity enough to store a predetermined number of still images and a moving image of a predetermined time. In sequential shooting to sequentially shoot a plurality of still images or in panoramic photographing, a large number of images can be written in the memory 30 at a high speed. The memory 30 can also be used as a work area for the system control circuit 50.

The compression/decompression circuit 32 compresses or decompresses image data by adaptive discrete cosine transform (ADCT) or the like. The compression/decompression circuit 32 loads an image stored in the memory 30, performs compression processing or decompression processing on the image, and writes the processed data into the memory 30.

The exposure control unit 40 controls the shutter 12 having the aperture function, and also has a flash light control function in cooperation with a flash 48.

The focusing control unit 42 controls focusing of the photographing lens 10. Reference numeral 44 denotes a zoom control unit which controls zooming of the photographing lens 10; and 46, a barrier control unit which controls operation of a protection unit 102 serving as a barrier.

The flash 48 has an AF auxiliary light projection function and flash light control function.

The exposure control unit 40 and focusing control unit 42 are controlled by the TTL method. The system control circuit 50 controls the exposure control unit 40 and focusing control unit 42 on the basis of the calculation result of calculating sensed image data by the image processing circuit 20.

The system control circuit 50 controls the overall digital camera 100. Reference numeral 52 denotes a memory which stores constants, variables, programs, and the like for operating the system control circuit 50.

Reference numeral 54 denotes a display unit which is made up of an LCD, LED, and the like and displays an operation status, message, and the like by using characters, images, sound, and the like in accordance with execution of a program by the system control circuit 50. One or a plurality of display units 54 are arranged at easy-to-see positions near the operation unit of the digital camera 100. Each display unit 54 is formed from a combination of an LCD, loudspeaker (sound generating device), and the like.

Some functions of the display unit 54 are arranged within an optical viewfinder 104. Of display contents of the display unit 54, those displayed on the LCD or the like are single-shot/sequential shooting, a self timer, a compression ratio, the number of recording pixels, the number of recorded images, the number of recordable images, a shutter speed, an F-number, exposure adjustment, flashing, pink-eye reduction, macro photographing, buzzer setting, a remaining timer battery level, a remaining battery level, an error state, information of plural digit numbers, attachment/detachment of an external storage medium 200, operation of a communication I/F, and the date and time.

Of display contents of the display unit 54, those displayed within the optical viewfinder 104 are a focusing state, a camera shake warning, a flash charge state, a shutter speed, an F-number, and exposure adjustment.

Reference numeral 56 denotes an electrically erasable/recordable nonvolatile memory such as an EEPROM.

Reference numerals 60, 62, 64, 66, 68, and 70 denote operation units which are used to input various operation instructions to the system control circuit 50. These operation units 60, 62, 64, 66, 68, and 70 are formed from one or a combination of a switch, dial, touch panel, pointing device based on line-of-sight detection, voice recognition device, and the like.

These operation units will be described in detail.

The mode dial switch 60 can switch between various function modes such as the power-off mode, automatic photographing mode, photographing mode, panoramic photographing mode, playback mode, multi-window playback/erase mode, and PC connection mode.

The shutter switch SW1 62 is turned on by half stroke of a shutter button (not shown) to designate the start of operation for AF (Auto Focus) processing, AE (Auto Exposure) processing, AWB (Auto White Balance) processing, EF (pre-flash) processing, and the like.

The shutter switch SW2 64 is turned on by full stroke of the shutter switch. The ON state of the shutter switch SW2 designates the start of a series of processing operations: exposure processing to write a signal read out from the image sensing device 14 as image data into the memory 30 via the A/D converter 16 and memory control circuit 22, development processing using calculations by the image processing circuit 20 and memory control circuit 22, and recording processing to read out image data from the memory 30, compress the image data by the compression/decompression circuit 32, and write the image data into the recording medium 200.

The image display ON/OFF switch 66 can set the ON/OFF state of the image display unit 28. In photographing with the optical viewfinder 104, this function can save power by stopping supply of a current to the image display unit which is formed from a TFT LCD or the like.

The quick review ON/OFF switch 68 sets a quick review function of automatically playing back photographed image data immediately after photographing.

The operation unit 70 is formed from various buttons, a touch panel, and the like, and includes a menu button, a setting button, a macro button, a multi-window playback/repaging button, a flash setting button, a single-shot/sequential shooting/self-timer switching button, a forward (+) menu button, a backward (−) menu button, a forward (+) playback image button, a backward (−) playback image button, a photographing quality selection button, an exposure adjustment button, and a date/time setting button.

Reference numeral 80 denotes a power control unit which comprises a battery detection circuit, a DC/DC converter, and a switch circuit for switching a block to be energized. The power control unit 80 detects attachment/detachment of the battery, the type of battery, and the remaining battery level. The power control unit 80 controls the DC/DC converter on the basis of detection results and an instruction from the system control circuit 50, and supplies a necessary voltage to respective units including a recording medium for a necessary period. A power supply (battery) 86 is stored in the apparatus body, and the body has a sensor for detecting opening/closing operation of the lid when the power supply 86 is stored.

Reference numeral 82 denotes a connector on the apparatus body side; and 84, a connector on the power supply side. The power supply 86 is formed from a primary battery (e.g., an alkaline battery or lithium battery), a secondary battery (e.g., an NiCd battery, NiMH battery, or Li battery), an AC adaptor, and the like.

Reference numeral 90 denotes a card controller which exchanges data with an external storage medium such as a memory card; 91, an interface with an external storage medium such as a memory card; 92, a connector which connects an external storage medium such as a memory card; and 98, a recording medium attachment/detachment detection unit which detects whether the recording medium 200 has been attached to the connector 92.

Note that the embodiment may adopt one or a plurality of systems of interfaces and connectors for connecting a recording medium. Further, the embodiment may adopt a combination of interfaces and connectors pursuant to different standards.

The embodiment may use an interface and connector complying with the standard of the PCMCIA card or CF (Compact Flash®) card.

The interface 91 and connector 92 may be ones complying with the standard of the PCMCIA card or CF (Compact Flash®) card. In this case, the interface 91 and connector 92 can connect various communication cards such as a LAN card, modem card, USB card, IEEE1394 card, P1284 card, SCSI card, and PHS communication card. The digital camera 100 can exchange image data and its accessory management information with a peripheral device (e.g., another computer or printer).

The protection unit 102 is a barrier which prevents contamination and damage of the image sensing unit by covering the image sensing unit including the lens 10 of the digital camera 100.

The optical viewfinder 104 enables photographing using only the optical viewfinder without using any electronic viewfinder function on the image display unit 28. The optical viewfinder 104 displays some functions of the display unit 54 such as an in-focus state, a camera shake warning, a flash charge state, a shutter speed, an F-number, and exposure adjustment. The external storage medium 200 is, e.g., a memory card.

The configuration of the digital camera 100 according to the embodiment has been described.

Figure 2:
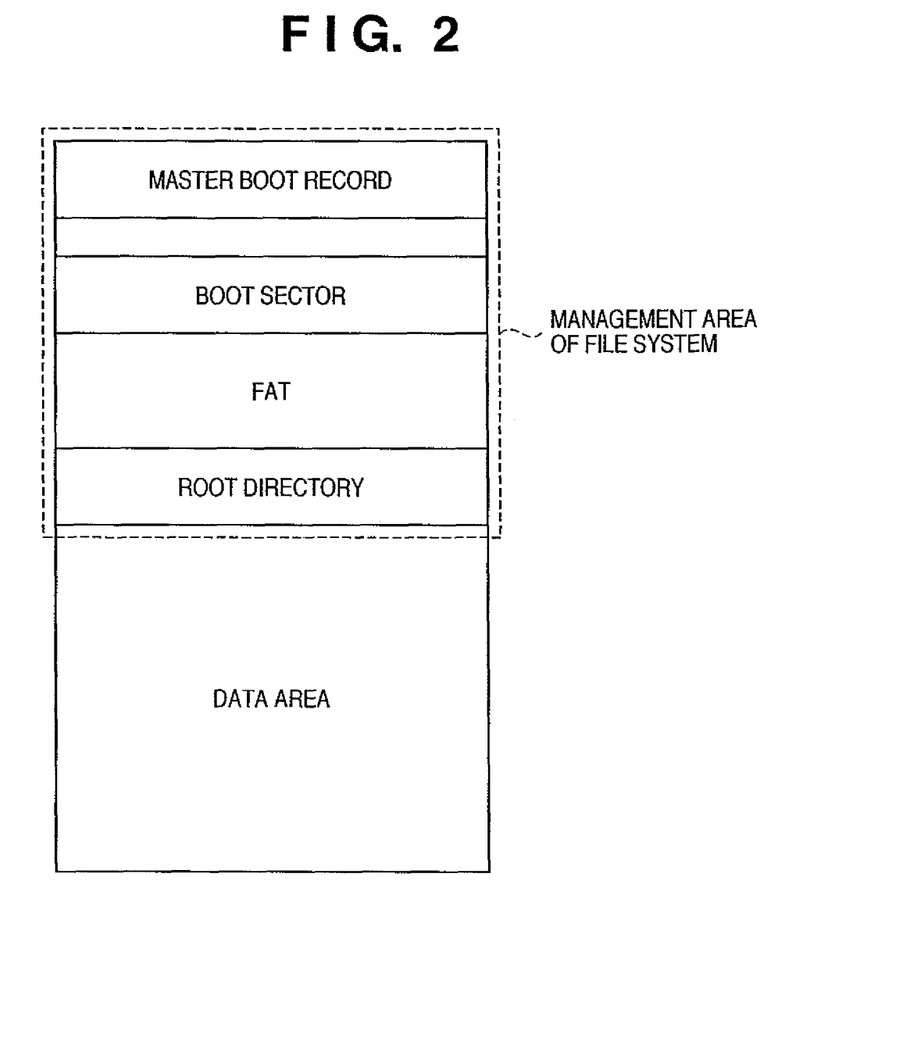
FIG. 2 is a view showing a logical structure in an external storage medium 200 according to the embodiment.

FIG. 2 is a view schematically showing the logical structure of a file system which is constructed in the external storage medium 200 according to the embodiment.

As shown in FIG. 2, the storage area of the external storage medium 200 is divided into the management area and data area of the file system.

The management area contains a master boot record (MBR), boot sector, FAT (File Allocation Table), and root directory entry. The MBR describes a partition table. The partition table represents a logical area called a partition including the position of the boot sector and the size of the data area. The boot sector describes basic information (e.g., cluster size and FAT size) used when the file system processes data stored in the data area. The cluster is a logically minimum size for processing data in the data area. The FAT is a table representing a file position in the data area by using the cluster as a reference. By analyzing the FAT, the order of clusters in which one file (e.g., image file) is stored can be detected. Also, by analyzing the FAT, the use status of the data area representing, e.g., which cluster is free (available) (entry which is cleared to 0 in the table) can be obtained.

In general, when general (logical) formatting is executed for the external storage medium 200, the file system operates to reconstruct the MBR and boot sector from device information of the external storage medium 200 and clear the FAT area and root directory entry to "0" after write. As a result, the entire data area of the external storage medium 200 becomes free in appearance.

This formatting will be called simple formatting (or logical formatting). In simple formatting, only data in the management area of the file system is rewritten, as described above. Previous data itself remains in the data area unless a new image is sensed and recorded.

The embodiment can execute not only simple formatting but also complete formatting on the external storage medium 200.

Complete formatting means processing of initializing the management area and erasing data from the data area. Since simple formatting initializes only the management area, previously stored image data may remain in the data area. To the contrary, complete formatting erases data even from the data area, and in its literal sense, makes it impossible to restore any previously stored data. The merits of complete formatting are to increase the data write speed and to prevent a third party from restoring data against user's will, as described above.

Figure 3:
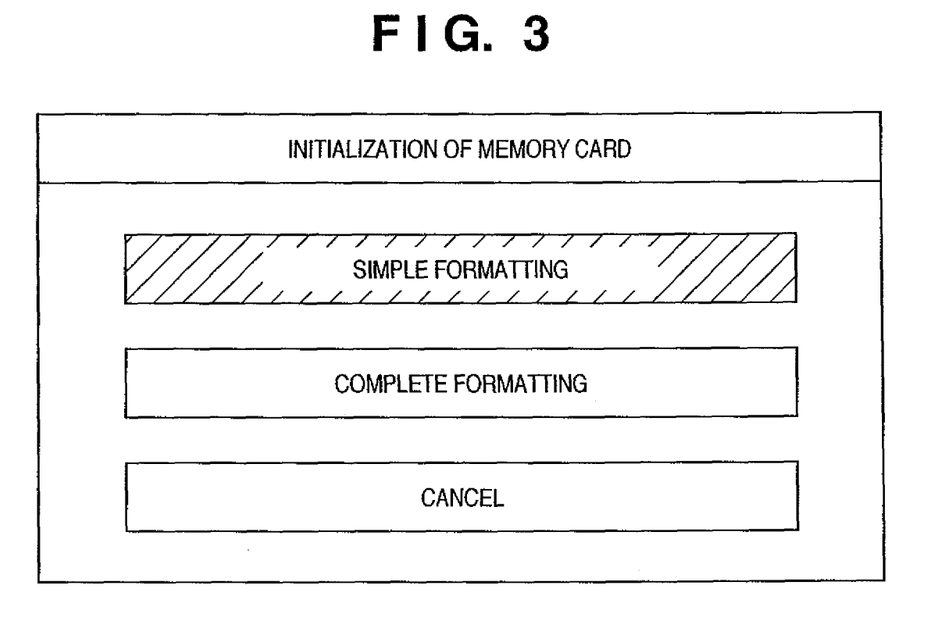
FIG. 3 is a view showing an example of a window displayed in a formatting menu according to the embodiment.

FIG. 3 shows an initialization menu displayed on the image display unit 28 when the operation unit 70 is operated to issue an instruction to initialize the external storage medium 200 (in many cases, when all data are to be erased).

As shown in FIG. 3, selectable items are three, "simple formatting", "complete formatting", and "cancel". "Simple formatting" is highlighted as a default setting. To select an item, the cross key (not shown) of the operation unit 70 is operated to change the highlight position, and an OK (or execution) key (not shown) is operated to execute selected processing. Note that the display form of the menu is not limited to FIG. 3, and is arbitrary.

A series of processes for an item selected from the display of the initialization menu will be explained with reference to the flowchart of FIG. 4. A program for the processes is stored as a program in the nonvolatile memory 56, and executed by the system control circuit 50. These processes are executed when a key of the operation unit 70 which designates initialization of an external storage medium is operated (or initialization may be selected from the menu display) is operated.

In step S1, an initialization menu as shown in FIG. 3 is displayed on the image display unit 28 to prompt the user to select any item. Selection operation has been described above.

In step S2, when the OK key is pressed, it is determined which of "simple formatting", "complete formatting", and "cancel" has been selected. If it is determined that "cancel" has been designated, the flow advances to step S3 to return to a state set before the initialization menu is displayed.

If "simple formatting" is designated, the flow advances to step S4. In step S4, the image display unit 28 displays a message that formatting is in progress, as shown in FIG. 5. Data is erased by the size of the management area (FIG. 3) of the file system in step S5, and the management area of the file system is reconstructed (written) in the erased management area in step S6. The flow advances to step S7 to display a formatting completion message (not shown), and the processing ends. In simple formatting, the user may change the cluster size. For this purpose, when simple formatting is designated and determined, a list of permissible cluster sizes based on the capacity of the external storage medium may be displayed to prompt the user to select one of the cluster sizes.

Since simple formatting initializes (erases and reconstructs) only the management area, as described above, the processing cannot be aborted. However, the time taken for simple formatting is several sec at most, and the user hardly misses a shutter chance.

If it is determined in step S2 that "complete formatting" has been designated, the processing advances to step S8. Processes in S8 to S10 are the same as those in steps S4 to S6, and a message that formatting of the management area is in progress is displayed, and erase and reconstruction of the management area are performed.

Upon the completion of formatting the management area, the flow advances to step S11 to determine a block size serving as an erase unit for the data area of the external storage medium 200. The block size is determined on the basis of the minimum erase block size which is defined for the external storage medium 200, and is a multiple of the minimum erase block size. At this time, the total number of blocks to be erased in the data area is obtained on the basis of the memory capacity of the external storage medium 200.

Figure 6:
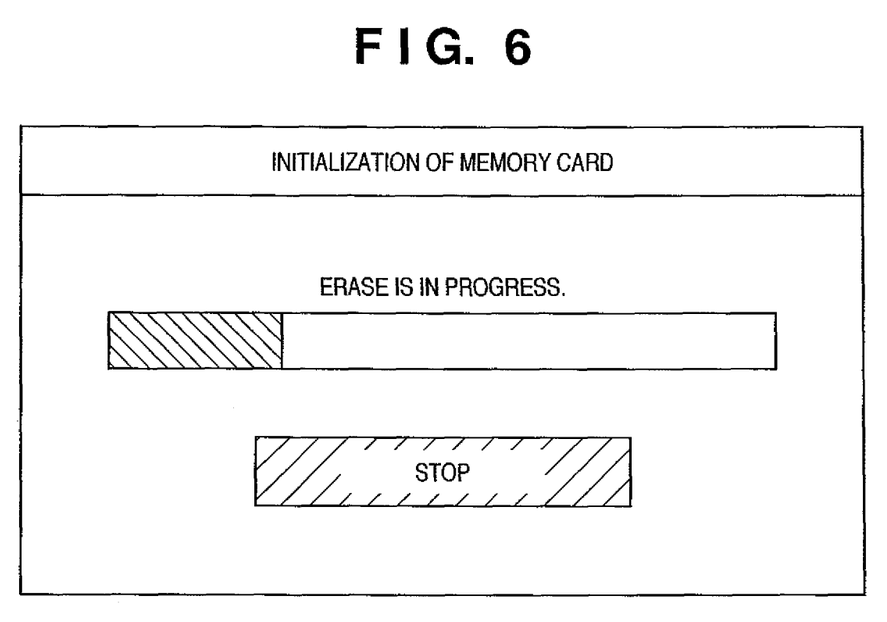
FIG. 6 is a view showing an example of a window displayed during erase of the data area according to the embodiment.

The flow advances to step S12 to display a window representing that erase is in progress, as shown in FIG. 6. Data area erase processing requires a time which depends on the capacity of the external storage medium 200. Since the number of blocks to be erased is larger than that for formatting of the management area, the processing requires about several min. The progress of processing is displayed by a bar chart (percentage=the number of erased blocks/the total number of blocks) as shown in FIG. 6 so that the user can recognize the progress. Since a long time is taken to complete erase of the data area, "stop" is highlighted to permit the press of the OK key so as to stop the processing at any time, as shown in FIG. 6. Note that no erased block exists in step S12, and the display example in FIG. 6 strictly represents the progress of erase to a certain degree.

It is determined in step S13 whether "stop" has been designated, and it is determined in step S14 whether emergency stop has been designated. "Stop" is designated by operating the OK key on the display window of FIG. 6. Emergency stop is triggered by a decrease in remaining battery level (determined by comparing a battery voltage with a threshold voltage value), opening/closing operation of the battery lid (detected by the sensor), power-off operation, or generation of an error.

If it is determined that "stop" has been designated, the flow advances to step S7. At this time, at least formatting of the management area has been completed, in other words, simple formatting has been completed. A message to this effect is displayed, and the processing ends.

If it is determined that emergency stop has been designated, the processing immediately aborts. The reason why emergency stop is set is that an external storage medium may be damaged when electrical processing proceeds for the external storage medium 200, and the battery runs out or is exchanged during the processing. Erase processing is stopped before this situation, and the safety of the external storage medium 200 is maintained.

If it is determined that neither "stop" nor "emergency stop" has been designated, the flow advances to step S15 to perform erase processing from the start of the data area of the external storage medium 200 in accordance with the determined erase block size. Then, the flow advances to step S16 to calculate the number of erased blocks/the total number of blocks and update the bar chart in FIG. 6 on the basis of the calculation result. In step S17, it is determined whether erase processing for all the blocks of the data area has been completed. If NO in step S17, the processing returns to step S13 to prepare for erase processing for the next block.

Upon the completion of erase processing for all the blocks of the data area of the external storage medium 200, the flow advances to step S18 to display a message that complete formatting has been completed, and the processing ends.

As described above, complete formatting in the embodiment includes two stages: management area formatting and data area erase processing. Input of a stop instruction is inhibited in the former management area formatting, but permitted for each erase block in the latter data area erase processing. That is, management area formatting can guarantee consistency of the file system of the external storage medium 200 by inhibiting the stop of processing. Data area erase processing is executed in the erase block unit, and even if the processing stops, a storage medium is not damaged. Data area erase processing can, therefore, quickly shift to another processing, e.g., image sensing processing by a digital camera, decreasing the possibility at which the user misses a shutter chance.

In the above description, the "emergency stop" instruction is triggered by a decrease in remaining battery level, opening/closing operation of the battery lid, power-off operation, generation of an error, or the like. In addition, operation of the shutter button may also be used as a trigger because processing of displaying a completion message can be omitted and the digital camera can quickly shift to the photographing mode.

As described above, according to the embodiment, formatting (complete formatting) of the management area + the data area can be executed as formatting of an external storage medium in addition to formatting (simple formatting) of only the management area of the file system. Consequently, write of large data per unit time in moving image photographing, sequential shooting, or the like can be performed at a high speed. During erase of the data area in complete formatting, the processing can be stopped at any time, avoiding a situation in which the user misses a shutter chance. When the remaining battery level drops, processing urgently stops in response to detection of an action such as battery exchange, and the safety of an external storage medium can be assured.

Second Embodiment

Complete formatting in the above embodiment executes initialization of the management area on the first stage and erase of the data area on the second stage, but the order of the processes may be reversed.

Figure 4:
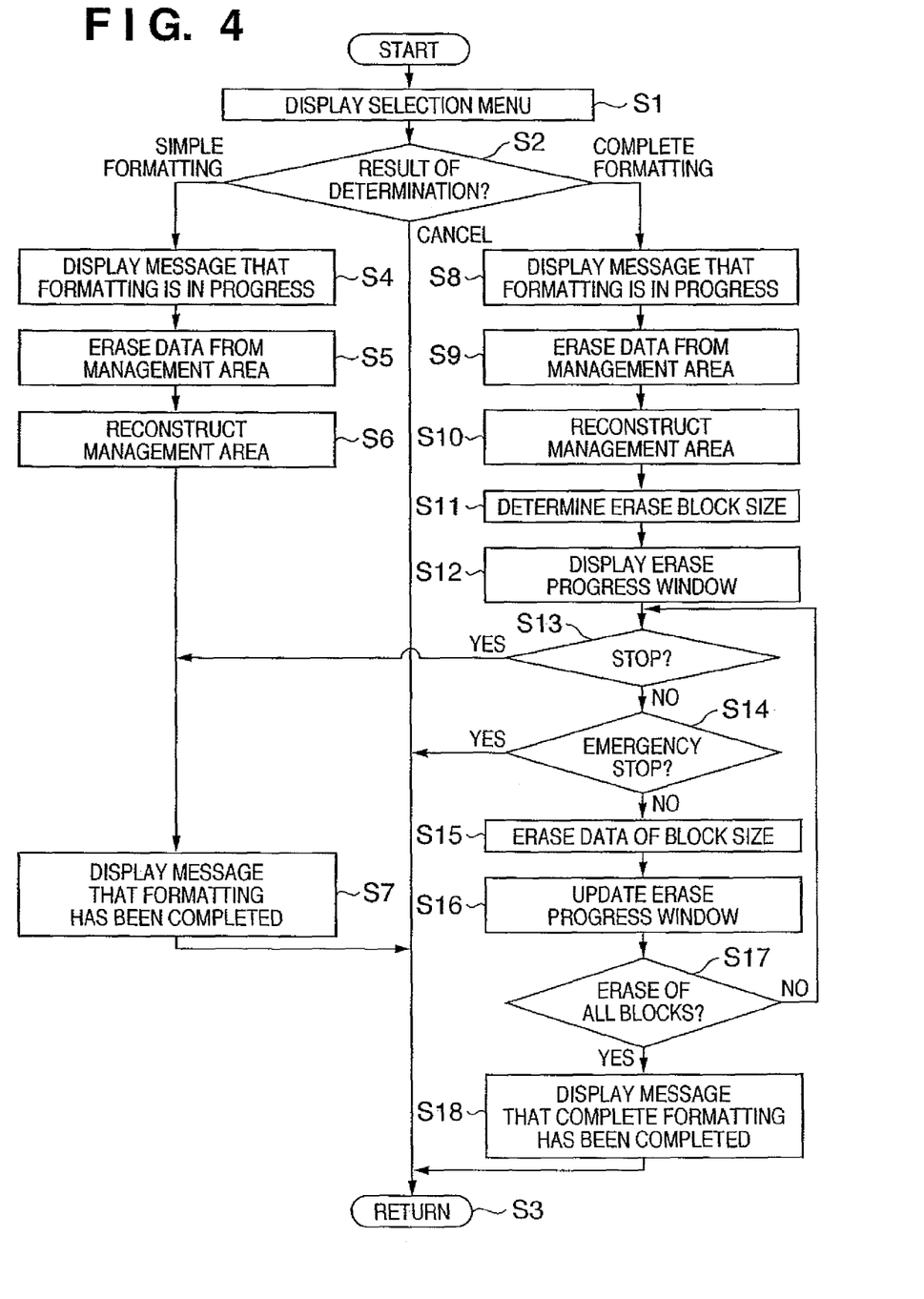
FIG. 4 is a flowchart showing a formatting processing sequence according to the embodiment.
Figure 5:
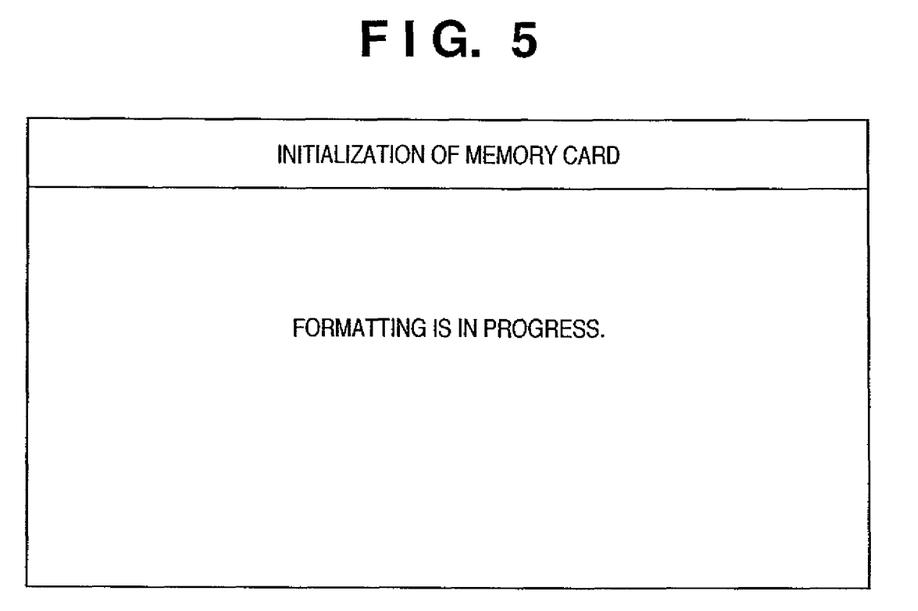
FIG. 5 is a view showing an example of a window displayed during formatting of the management area according to the embodiment.
Figure 7:
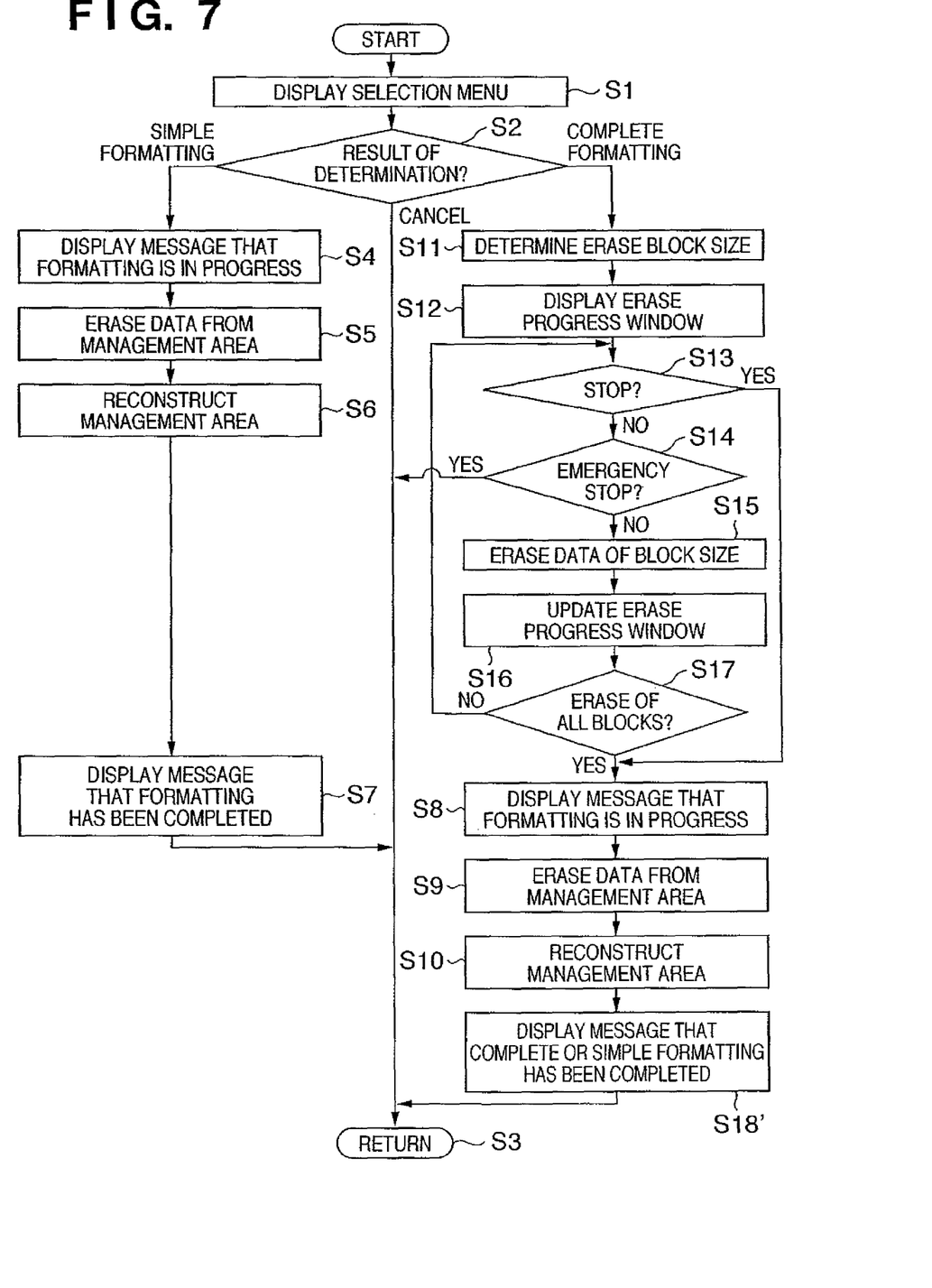
FIG. 7 is a flowchart showing a formatting processing sequence according to the second embodiment.

In this case, processing shown in FIG. 7 is performed instead of the flowchart of FIG. 4. The processing in FIG. 7 is substantially different from that in FIG. 4 in that steps S8 to S10 in FIG. 4 are replaced with steps S11 to S16, i.e., data is erased from the data area on the first stage and then the management area is initialized on the second stage. Processing in each step is the same, the same reference numerals denote the same processes, and a description thereof will be omitted.

It should be noted that when stop is designated during erase of the data area, processing is not stopped, but the flow advances to step S8 to initialize the management area. In step S18', messages are displayed in correspondence with two cases: the flow advances to processing corresponding to a stop instruction, and erase processing for all the blocks of the data area is completed.

In step S11 of FIG. 7, the erase block size is determined on the basis of the minimum erase block size which is defined for an external storage medium 200, and is a multiple of the minimum erase block size.

In the flowchart of FIG. 7, if stop is designated during data area erase processing, the management area is initialized. Since the size of the management area is small enough, the processing stops with a delay of about several sec, as described above. Hence, the second embodiment can attain almost the same operation effects as those of the first embodiment described above without giving the user any sense of incompatibility.

The first and second embodiments have described a digital camera. However, the present invention is not limited to this, and can be apparently applied to an apparatus which can write information into a writable nonvolatile storage medium such as a flash memory.

As has been described above, according to the present invention, when initialization of a storage medium such as a flash memory is erase of the data area, the processing can be stopped. When the processing is stopped, at least initialization of the management area has been completed, and processing using the storage medium can be executed. If erase processing is not stopped but proceeds to the end, no erase processing need be performed in writing new data, and high-speed write is promised.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-336222 filed on 19 Nov. 2004, which is hereby incorporated by reference herein.

What is claimed is:

1. A memory control apparatus to control a non-volatile memory in accordance with a file system which composes a data area for storing a file and a management area for storing management information of the file, the memory control apparatus comprising:
   a formatting unit adapted to selectively implement a first formatting which erases the management information in the management area but does not erase data in the data area, or a second formatting which erases both the management information in the management area and the data in the data area;
   a control unit adapted to:
      inhibit designation of stopping the formatting while the first formatting is implemented;
      control a display unit to display information indicating that the formatting is in progress without indicating a ratio of erased data or that the user is able to stop the formatting while the management information is being erased during the first formatting;
      inhibit designation of stopping the formatting while erasing the management information while the second formatting is implemented;
      control the display unit to display information indicating that the formatting is in progress without indicating a ratio of erased data or that the user is able to stop the formatting while erasing the management information in the management area during the second formatting, and to further display information indicating a progress of data erase and permission for designation of stopping the formatting while erasing the data in the data area during the second formatting; and
      control to stop the second formatting if the designation of stopping the formatting is input while the information indicating the progress of data erase is being displayed.

2. The memory control apparatus according to claim 1, wherein:
   the formatting unit erases the data in the data area of the non-volatile memory in a unit of a block for the file system during the second formatting, and
   the control unit enables inputting of the designation of stopping the formatting during the erasing of the unit of the block.

3. The memory control apparatus according to claim 1, wherein the non-volatile memory is an external memory which is connected with the memory control apparatus via an interface device.

4. The memory control apparatus according to claim 1, wherein after the second formatting is stopped, the control unit controls the display unit to display a same screen as a screen displayed when the first formatting is finished.

5. The memory control apparatus according to claim 1, wherein:
   the memory control apparatus is included in a digital camera, and
   the display device has a function of the electric finder of the digital camera.

6. A method of controlling a memory control apparatus to control a non-volatile memory in accordance with a file system which composes a data area for storing a file and a management area for storing management information of the file, the method comprising:
   a formatting step of selectively implementing a first formatting which erases the management information in the management area but does not erase data in the data area, or a second formatting which erases both the management information in the management area and the data in the data area;

a first designation inhibiting step of inhibiting designation of stopping the formatting while the first formatting is implemented;

a first display control step of controlling a display unit to display information indicating that the formatting is in progress without indicating a ratio of erased data or that the user is able to stop the formatting while the management information is being erased during the first formatting;

a second inhibiting step of inhibiting designation of stopping the formatting while erasing the management information while the second formatting is implemented;

a second display control step of controlling the display unit to display information indicating that the formatting is in progress without indicating a ratio of erased data or that the user is able to stop the formatting while erasing the management information in the management area during the second formatting, and to further display information indicating a progress of data erase and permission for designation of stopping the formatting while erasing the data in the data area during the second formatting; and a stopping step of stopping the second formatting if the designation of stopping the formatting is input while the information indicating the progress of data erase is being displayed.

7. The method according to claim 6, wherein:
the formatting step erases the data in the data area of the non-volatile memory in a unit of a block for the file system during the second formatting, and
the method further comprises the step of enabling inputting of the designation of stopping the formatting during the erasing of the unit of the block.

8. The method according to claim 6, wherein the non-volatile memory is an external memory which is connected with the memory control apparatus via an interface device.

9. The method according to claim 6, further comprising the step of, after the second formatting is stopped, controlling the display unit to display a same screen as a screen displayed when the first formatting is finished.

10. The method according to claim 6, wherein:
the memory control apparatus is included in a digital camera, and
the display device has a function of the electric finder of the digital camera.

* * * * *